United States Patent
Koga

(10) Patent No.: US 10,467,328 B2
(45) Date of Patent: Nov. 5, 2019

(54) SYSTEM AND METHOD OF PROVIDING DISPLAY INFORMATION BASED ON HYBRID APPLICATION

(71) Applicant: GREE, Inc., Minato-ku (JP)

(72) Inventor: Yuichi Koga, Minato-ku (JP)

(73) Assignee: GREE, Inc., Minato-ku (JP)

( * ) Notice: Subject to any disclaimer, the term of this patent is extended or adjusted under 35 U.S.C. 154(b) by 617 days.

(21) Appl. No.: 14/923,774

(22) Filed: Oct. 27, 2015

(65) Prior Publication Data

US 2016/0048479 A1 Feb. 18, 2016

Related U.S. Application Data

(63) Continuation of application No. PCT/JP2014/061275, filed on Apr. 22, 2014.

(30) Foreign Application Priority Data

Apr. 30, 2013 (JP) ................................ 2013-095768

(51) Int. Cl.
*G06F 17/21* (2006.01)
*G06F 16/957* (2019.01)

(52) U.S. Cl.
CPC ........ *G06F 17/212* (2013.01); *G06F 16/9577* (2019.01)

(58) Field of Classification Search
CPC ........................... G06F 17/212; G06F 16/9577
See application file for complete search history.

(56) References Cited

U.S. PATENT DOCUMENTS 7,027,101 B1 * 4/2006 Sloo .................. H04N 5/44504
348/564
7,594,847 B1 * 9/2009 York ....................... A63F 13/00
463/2

(Continued)

FOREIGN PATENT DOCUMENTS

JP 10-214171 A 8/1998
JP 2001-340656 A 12/2001

(Continued)

OTHER PUBLICATIONS

Japanese Office Action dated Apr. 7, 2015, issued in Japanese Patent Application No. 2014-531029 (with English translation).

(Continued)

*Primary Examiner* — Asher D Kells
(74) *Attorney, Agent, or Firm* — Oblon, McClelland, Maier & Neustadt, L.L.P.

(57) ABSTRACT

Content displayed in an area displayed by a native application can be changed without being updated by a user. A first image is generated on a communication terminal (20) in response to launching of an application installed on the communication terminal (20) and is displayed in a first area on a screen of the communication terminal (20). An image generator (16) generates a second image displayed in a second area differing from the first area. The image generator (16) also generates a third image displayed in a third area included in the first area. A server (10) displays the second image in the second area on the screen of the communication terminal (20) and displays the third image by overlaying the third image on the first image in the third area included in the first area on the screen of the communication terminal (20).

17 Claims, 14 Drawing Sheets

(56) References Cited

U.S. PATENT DOCUMENTS

2009/0150541 A1* 6/2009 Georgis ............... G06F 9/4443
  709/224
2013/0019203 A1* 1/2013 Kotler ............... G06F 3/04812
  715/811

FOREIGN PATENT DOCUMENTS

| | | |
|---|---|---|
| JP | 2002-092488 A | 3/2002 |
| JP | 2002-215551 | 8/2002 |
| JP | 2004-070845 A | 3/2004 |
| JP | 2005-215781 | 8/2005 |
| JP | 2007-206876 A | 8/2007 |
| JP | 2007-241894 A | 9/2007 |
| JP | 2008-118346 A | 5/2008 |
| JP | 2009-053219 A | 3/2009 |
| JP | 2009-140501 | 6/2009 |
| JP | 2012-208792 A | 10/2012 |
| WO | WO 2008/088091 A1 | 7/2008 |

OTHER PUBLICATIONS

Japanese Office Action dated Jan. 6, 2015, issued in Japanese Patent Application No. 2014-531029 (with English translation).
International Search Report dated Jul. 1, 2014, for PCT/JP2014/061275 filed Apr. 22, 2014 (with English translation).
Office Action dated Feb. 14, 2017 in Japanese Patent Application No. 2015-215903 (with English translation).
Notification of Reasons for Refusal dated Aug. 23, 2016 in Japanese Patent Application No. 2015-215903 (with English language translation).
Japanese Office Action dated Feb. 27, 2018 in Patent Application No. 2017-1222515 (with English translation), 4 pages.
Japanese Office Action dated Feb. 27, 2018 in Patent Application No. 2017-122515 (with English translation), 4 pages.
Office Action dated Jul. 2, 2019, in Japanese Patent Application No. 2018-206506 (with English-language translation).

* cited by examiner

FIG. 17

| Action by user | Number of points added |
|---|---|
| Select my page | |
| Game play | |
| Game play | |
| Press gacha button | |
| Transition to deck selection screen | Deck + 1 |
| Construct deck | Deck + 1 |
| Game play | |
| Select my page | |
| Game play | |
| Transition to deck selection screen | Deck + 1 |
| Select guild | Guild + 1 |
| Game play | |
| Select guild | Guild + 1 |
| Construct deck | Deck + 1 |
| Game play | |
| Transition to deck selection screen | Deck + 1 |
| Construct deck | Deck + 1 |
| Game play | |
| Select my page | |

FIG. 18

| Action by user A | Action by user B |
|---|---|
| Press menu | Select my page |
| Select guild | Game play |
| Game play | Game play |
| Select guild | Press gacha button |
| Talk with guild member<br>Battle together with guild member<br>Express gratitude on guild member page<br>Select my page<br>Game play | Transition to deck selection screen |
| | Construct deck |
| | Game play |
| | Select my page |
| | Game play |
| Press gacha button | Transition to deck selection screen |
| Transition to deck selection screen | Construct deck |
| Construct deck | Game play |
| Press menu | Transition to deck selection screen |
| Select guild | Construct deck |
| Game play<br>Select guild | Game play |
| | Transition to deck selection screen |
| | Select guild |
| Talk with guild member<br>Battle together with guild member<br>Express gratitude on guild member page | Game play<br>Select my page |

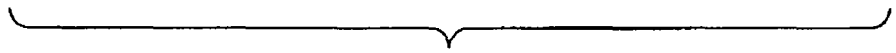

FIG. 19

| User ID | Guild ID | Leader flag |
|---------|----------|-------------|
| User 1  | Guild 1  |             |
| User 2  | Guild 1  | V           |
| ⋮       | ⋮        |             |
| User N  | Guild 1' |             |
| User X1 | Guild 2  |             |
| User X3 | Guild 2  |             |
| ⋮       | ⋮        |             |
| User XN | Guild 2  | V           |

SYSTEM AND METHOD OF PROVIDING
DISPLAY INFORMATION BASED ON
HYBRID APPLICATION

CROSS-REFERENCE TO RELATED APPLICATIONS

This application is a continuation of prior International Application No. PCT/JP2014/061275 filed on Apr. 22, 2014, which is based upon and claims the benefit of priority from Japanese Patent Application No. 2013-095768 filed on Apr. 30, 2013; the entire contents of which are incorporated herein by reference.

TECHNICAL FIELD

This disclosure relates to a method of providing display information, a display information provision program, and a server.

BACKGROUND

In recent years, a variety of applications (programs) have been developed in order, for example, to provide a game that can be played on a communication terminal (mobile terminal) operated by a user.

In general, such applications can be roughly divided into native applications and web applications.

Native applications are downloaded onto a communication terminal, installed on the communication terminal, and used. Native applications depend on the OS of the communication terminal, such as an iPhone (registered trademark), Android (registered trademark) device, or other smart phone. For example, a server transmits native applications such as an iPhone application written in Objective-C and an Android application written in Java (registered trademark) to communication terminals according to the platform.

While native applications can run faster than web applications, two versions of native applications need to be developed: one in the Objective-C programming language for iPhones, and one in the Java programming language for Android devices. Furthermore, native applications need to be installed on the communication terminal each time they are updated.

Web applications, on the other hand, operate on a web server and are used in a web browser on the terminal. Such web applications can be cross-developed for both platforms based on a language such as Hyper Text Markup Language 5 (HTML5), Javascript (registered trademark), Cascading Style Sheets 3 (CSS3), or the like. Furthermore, since web applications do not depend on the OS of the terminal, they can be developed with relative ease. Web applications, however, operate slower than native applications.

Therefore, in recent years, an application that combines a native application and a web application (hybrid application) has gained attention. Such a hybrid application can display web content within a native application. This is implemented by using a mechanism to embed a function similar to a simplified browser within the native application. This mechanism is referred to as UIWebView on iOS (registered trademark) and as WebView on Android.

An area displayed by the native application and an area displayed by the web application (UIWebView or WebView) are included in the display screen of the communication terminal on which such a hybrid application is launched.

CITATION LIST

Patent Literature

PTL 1: JP 2004-070845 A

SUMMARY

Technical Problem

To change the content displayed in the area that is displayed by a native application, the user needs to update the data in the area displayed by the native application. This operation is troublesome for the user.

Therefore, it would be helpful to provide a method of providing display information, a display information provision program, and a server that can change the content of an area displayed by a native application without the user updating the data in the area displayed by the native application.

Solution to Problem

One or more non-transitory computer-readable recording media, according to an aspect of this disclosure, configured to store instructions, which when executed by an information processing device configured to communicate with a server, cause the information processing device to:
display first information stored by the information processing device on a display;
transmit, to the server, input information corresponding to an input received at the information processing device;
receive, from the server, layout information corresponding to a display layout that is related to one or more pieces of second information identified based on the input information; and
display, based on the layout information, the one or more pieces of second information on the display by overlaying the one or more pieces of second information on the first information.

Advantageous Effect

This disclosure allows for changing the content displayed in an area displayed by a native application without the user updating the data in the area displayed by the native application.

BRIEF DESCRIPTION OF THE DRAWINGS

In the accompanying drawings:

FIG. 17 illustrates a table in which user actions targeted for counting are associated with the number of points added to the count of a shortcut;

FIG. 18 illustrates actions by different users A and B;

FIG. 19 illustrates the data structure that is stored in a rate of utilization storage 15 (database) in the server 10 and that illustrates the relationship between users and guilds.

DETAILED DESCRIPTION

The following describes embodiments with reference to the drawings.

Figure 1:
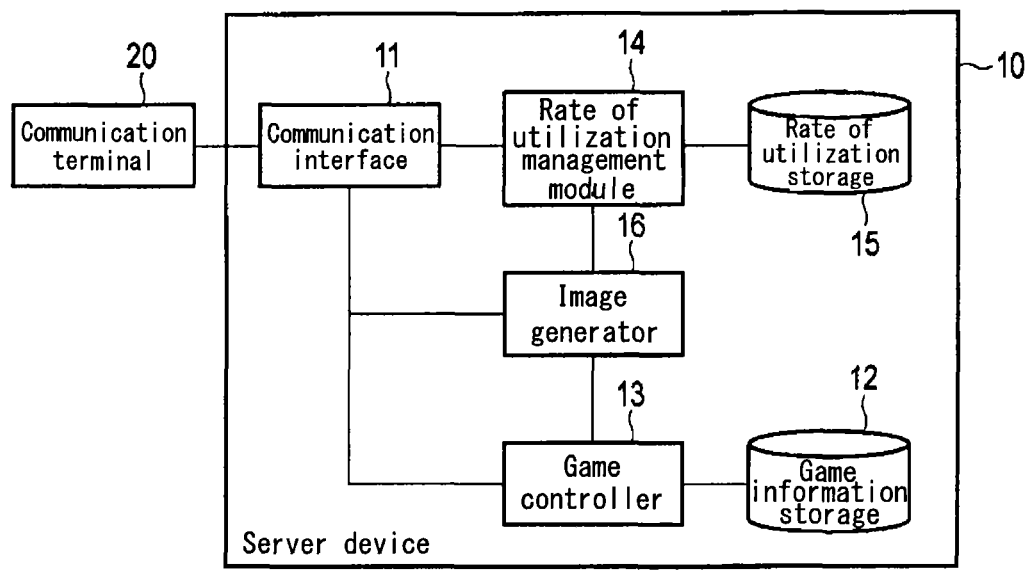
FIG. 1 is a block diagram illustrating the hardware structure of a network system that includes a server device according to one of the disclosed embodiments.

FIG. 1 is a block diagram illustrating the hardware structure of a network system that includes a server device according to this embodiment.

The network system illustrated in FIG. 1 is mainly formed by a server 10 and a communication terminal 20. The server 10 and the communication terminal 20 are connected over a network, such as the Internet, to allow for communication.

For example, a smart phone, feature phone, tablet, or the like may be used as the communication terminal 20.

In this embodiment, it is assumed that an application that combines a native application and a web application (hybrid application) is installed on the communication terminal 20. A native application refers to an application that is downloaded onto the communication terminal 20, installed on the communication terminal 20, and used. A web application, on the other hand, refers to an application that operates on a web server and is used in a web browser on a terminal.

The hybrid application installed on the communication terminal 20 is downloaded from another server that differs from the server 10. The other server is, for example, a server that provides a program that gets installed on the communication terminal. The server 10 and the other server may be the same server.

An area displayed by the native application and a different area displayed by the web application are included in the display screen of the communication terminal 20 on which such a hybrid application, which combines a native application and a web application, is launched. In the area displayed by the native application, an image generated on the communication terminal 20 in response to launching of the application is displayed. The image displayed in the area that is displayed by the web application is described below.

In this embodiment, the server 10 for example operates as a game control device that controls a game played by the user by launching the above-mentioned application (hybrid application) on the communication terminal 20. By the application being launched on the communication terminal 20, a plurality of functions related to the game are provided to the user.

The server 10 includes a communication interface 11, game information storage 12, game controller 13, rate of utilization management module 14, rate of utilization storage 15, and image generator 16.

The communication interface 11 has the function of communicating with the communication terminal 20. The communication interface 11 receives, from the communication terminal 20, information indicating a user operation on the communication terminal 20 for playing the game (operation information).

A variety of information for controlling the game (game information) is stored in the game information storage 12.

Based on the operation information received by the communication interface 11 and the game information stored in the game information storage 12, the game controller 13 controls the game played by the user.

Based on the operation information received by the communication interface 11, the rate of utilization management module 14 manages (rate of utilization information that indicates) the rate of utilization by the user of the plurality of functions related to the game provided by the above-mentioned application.

Based on management by the rate of utilization management module 14, rate of utilization information is stored in the rate of utilization storage 15.

The image generator 16 generates an image displayed in the area displayed by the web application in accordance with control of the game by the game controller 13. The image generator 16 also generates an image displayed in a portion of the area displayed by the native application.

The images generated by the image generator 16 are transmitted to the communication terminal 20 via the communication interface 11. In this way, the images generated by the image generator 16 are displayed in the corresponding areas on the screen of the communication terminal 20.

When the application is launched on the communication terminal 20, an image generated on the communication terminal 20 is displayed, as described above, in the area displayed by the native application on the display screen of the communication terminal 20. The image that is generated by the image generator 16 and displayed in a portion of the area displayed by the native application is overlaid on the image generated by the communication terminal 20.

Figure 2:
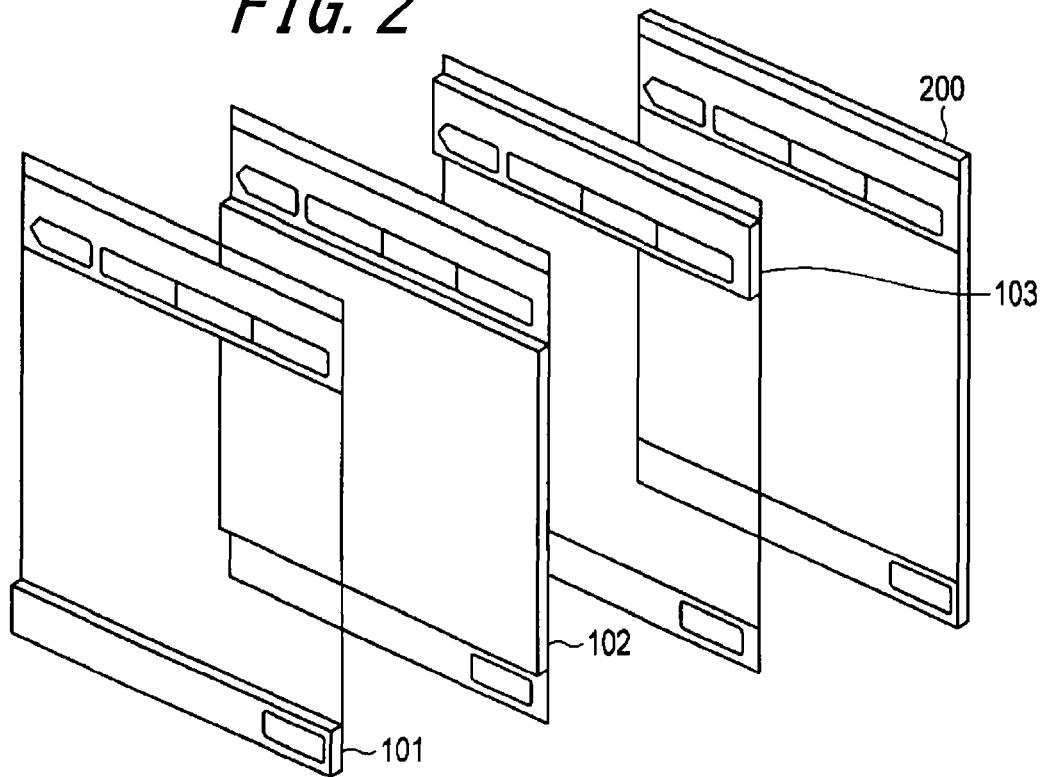
FIG. 2 illustrates a display screen of a communication terminal 20 according to one of the embodiments.

With reference to FIG. 2, a display screen (layer structure) of the communication terminal 20 in this embodiment is described.

As illustrated in FIG. 2, a footer area 101 positioned at the bottom is provided on the display screen of the communication terminal 20. This footer area 101 is an area displayed by the native application. For example, a navigation toolbar is displayed in this footer area 101.

A content area 102 is positioned in the middle of the display screen of the communication terminal 20. The content area 102 is an area displayed by the web application. A variety of web contents, for example, are displayed in the content area 102.

Furthermore, a header area 103 is positioned at the top of the display screen of the communication terminal 20. This header area 103 is an area displayed by the native application. For example, a navigation bar is displayed in this header area 103. In this embodiment, the header area 103 is also an area displayed by the web application, and an image generated on the server 10 may be displayed in this header area 103.

The areas displayed by the web application are implemented by UIWebView when the communication terminal is an iPhone, and at this time, WebViewJavascriptBridge is used.

Combining such areas 101 to 103 implements a display screen in which web content can be displayed within a native application (i.e. a display screen by a hybrid application).

Figure 3:
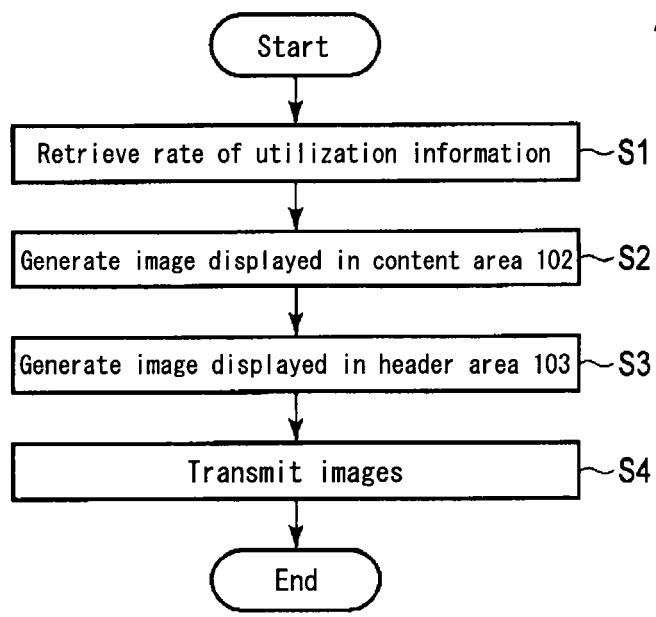
FIG. 3 is a flowchart illustrating procedures by a server 10 according to one of the embodiments.

Next, with reference to the flowchart in FIG. 3, procedures by the server 10 according to this embodiment are described. Here, it is assumed that the above-described application (hybrid application that combines a native application and a web application) is downloaded in advance and installed on the communication terminal 20.

It is also assumed that, for example, an application is launched in accordance with user operation on the communication terminal 20. In this case, an image (first image) generated on the communication terminal 20 in response to launching of the application is displayed in the footer area 101 and the header area 103 on the display screen of the communication terminal 20.

When the application is launched on the communication terminal 20, the rate of utilization management module 14 included in the server 10 retrieves rate of utilization information stored in the rate of utilization storage 15 (step S1). The rate of utilization information retrieved by the rate of utilization management module 14 is information indicating the rate of utilization by the user of a plurality of functions related to the game.

Next, the image generator 16 generates an image (second image) displayed in the content area 102, which is an area other than the footer area 101 and the header area 103 (which are areas displayed by the native application) (step S2). The image generated by the image generator 16 is an image related to the game played by the user by launching the application (game image).

The image generator 16 also generates an image (third image) displayed in the header area 103, which is a portion of the area displayed by the native application (step S3). Specifically, based on the rate of utilization information retrieved in step S1, the image generator 16 generates an image that includes a shortcut key allowing for use of a function with a high rate of utilization among the plurality of functions related to the game (shortcut image).

The game image and the shortcut image generated by the image generator 16 are transmitted to the communication terminal 20 via the communication interface 11 (step S4). In this case, the game image is displayed in the content area 102 on the display screen of the communication terminal 20. On the other hand, the shortcut image is displayed in the header area 103 on the display screen of the communication terminal 20. While the images generated on the communication terminal 20 in response to launching of the application are displayed in the footer area 101 and the header area 103 on the display screen of the communication terminal 20 as described above, the shortcut image is overlaid on the image in the header area 103.

Figure 4:
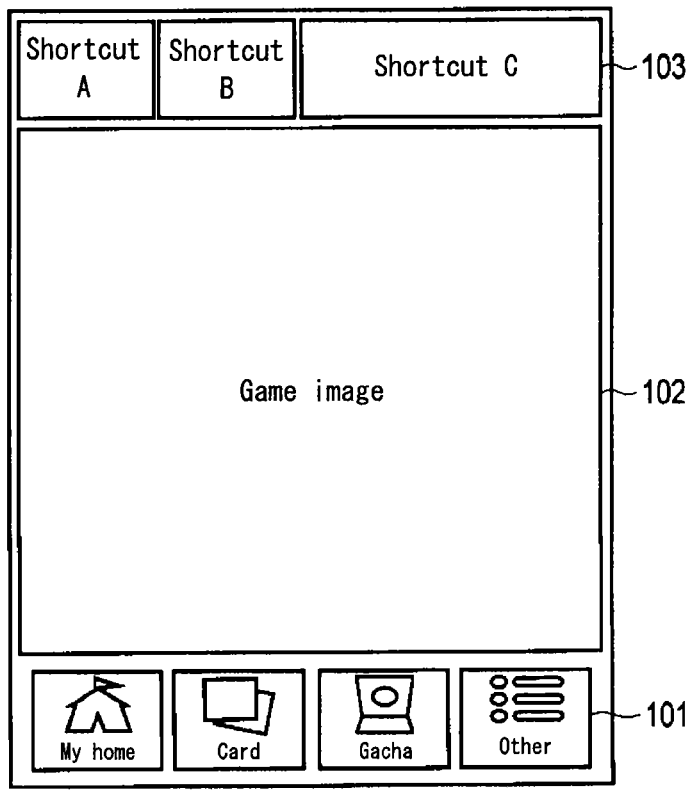
FIG. 4 illustrates a specific example of the display screen on the communication terminal 20.

FIG. 4 illustrates a specific example of the display screen on the communication terminal 20. As illustrated in FIG. 4, on the display screen of the communication terminal 20, for example a variety of menus (for example, a navigation toolbar) or the like for playing the game are displayed in the footer area 101, a game screen is displayed in the content area 102, and a shortcut image is displayed in the header area 103.

Figure 5:
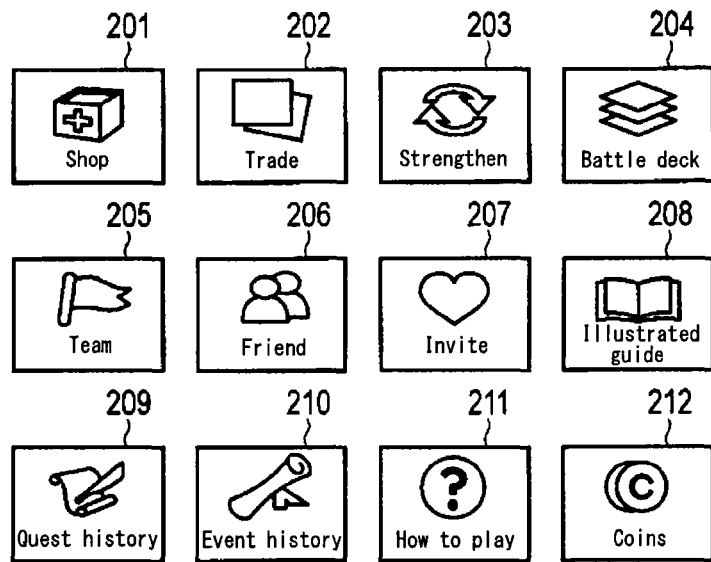
FIG. 5 illustrates examples of icons representing functions related to a game.

As the shortcut image in the header area 103, icons representing a variety of functions are displayed. The icons displayed in the header area 103 are now described briefly. Here, it is assumed that the game played by the user by launching the application is a game to defeat an enemy opponent using cards (characters) that the user possesses. In this case, for example the icons 201 to 212 or the like illustrated in FIG. 5 are included in the icons displayed in the header area 103 (i.e. the icons representing functions related to the game).

Icon 201 represents a "shop" function. With this "shop" function, the user can, for example, purchase a variety of items (recovery medicine, stamina medicine, and the like) that are usable in the game.

Icon 202 represents a "strengthen" function. With this "strengthen" function, the user can, for example, strengthen the cards that the user possesses and can use in the game.

Icon 203 represents a "trade" function. With this "trade" function, the user can, for example, exchange (trade) a card with another user (friend) playing the game.

Icon 204 represents a "battle deck" function. With this "battle deck" function, the user can, for example, use a plurality of cards that the user possesses to construct a deck (attack deck, defense deck, or the like) for playing the game.

Icon 205 represents a "team" function. With this "team" function, the user can form a team within the game.

Icon 206 represents a "friend" function. With this "friend" function, the user can display and confirm the status of registered friends.

Icon 207 represents an "invite" function. With this "invite" function, the user can invite another user to join the user's team. With this "invite" function, the user can also confirm matters such as whether the user has been invited to join another team.

Icon 208 represents an "illustrated guide" function. With this "illustrated guide" function, the user can display and confirm the enemy characters that the user has defeated.

Icon 209 represents a "quest history" function. With this "quest history" function, the user can display and confirm the degree to which each quest that is set in advance in the game has been cleared.

Icon 210 represents an "event history" function. With this "event history" function, the user can display and confirm the degree to which each event that has occurred in response to game progress or the like has been cleared.

Icon 211 represents a "how to play" function. With this "how to play" function, the user can display and confirm how to play the game.

Icon 212 represents a "coins" function. With this "coins" function, the user can display and confirm the number of pieces of game currency (coins) acquired in accordance with game progress and the way of using the coins.

Icons displaying functions with a high rate of utilization among (icons 201 to 212 that represent) the plurality of functions related to the game come to be displayed in the header area 103 on the display screen of the communication terminal 20.

After such a screen is displayed in the communication terminal 20, the game is controlled by the game controller 13 in response to user operation of the communication terminal 20. By the game screen being updated in response to this control, the user can play the game.

As described above, functions with a high rate of utilization can be selected from among the shortcut images displayed in the header area 103 and used. Other functions can, for example, be selected from the "other" tab in the menu displayed in the footer area 101. When a function provided by the application is used in this way, rate of utilization information that is stored in the rate of utilization storage 15 and that indicates the rate of utilization of the function is updated by the rate of utilization management module 14. The rate of utilization of each function as stored in the rate of utilization storage 15 may be based on the (total) length of time that the function is used, or based on the number of times the function is selected by the user.

In this embodiment, shortcut images are described as being displayed on the header area 103, but alternatively, by setting the footer area 101 to be an area displayed by the web application, the shortcut images may be displayed in the footer area 101 instead of in the header area 103.

Furthermore, the image displayed in the header area 103 may be an image other than a shortcut image (such as a variety of advertisements or the like).

In this embodiment, since the header area 103 is an area displayed by the native application, the image generated on the communication terminal 20 in response to launching of the application can be displayed as is by setting the shortcut image not to be displayed in response to operation.

In this embodiment, shortcut images (including shortcut keys) that allow for use of functions having a high rate of utilization among a plurality of functions related to the game have been described as being generated. Functions that can be used from these shortcut images may, however, be decided on with a different method. Specifically, a condition may be set in advance for each of the plurality of functions related to a game, and the shortcut image may be generated based on this condition.

Figure 6:
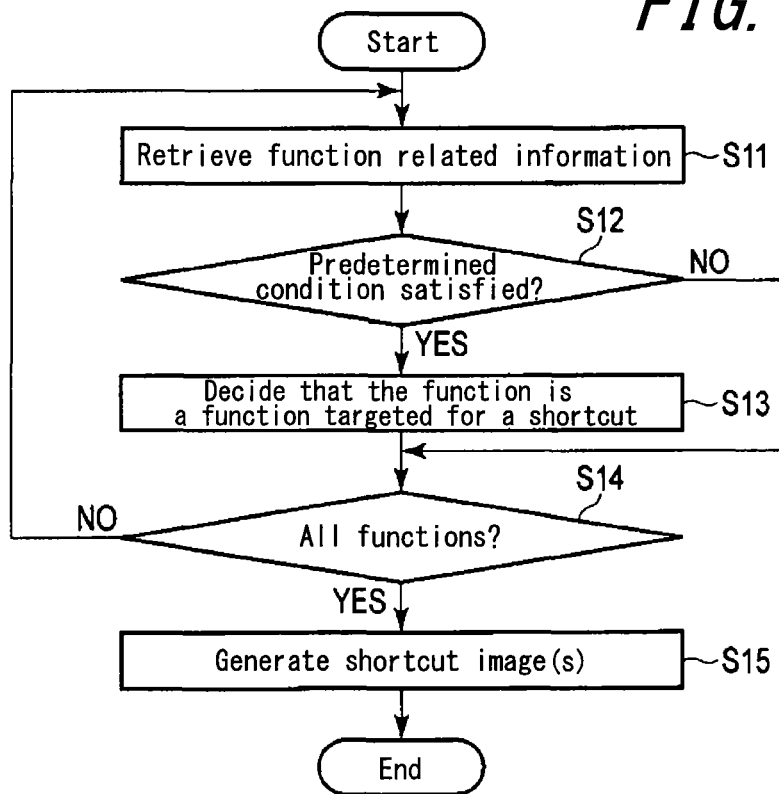
FIG. 6 is a flowchart illustrating procedures by the server 10 when generating a shortcut image based on a condition set in advance for each of a plurality of functions related to a game.

With reference to the flowchart in FIG. 6, the following describes procedures by the server 10 when generating a shortcut image based on a condition set in advance for each of a plurality of functions related to the game.

In this case, the image generator 16 included in the server 10 executes the processing in steps S11 to S13 below for each of the plurality of functions related to the game. The function that is targeted by the processing in steps S11 to S13 is referred to as the targeted function.

First, the image generator 16 retrieves information on the targeted function (function related information) (step S11). This function related information is retrieved from the game controller 13, which controls matters such as game progress, or the like.

Next, the image generator 16 judges whether the retrieved function related information satisfies a predetermined condition (i.e. a condition set in advance for the targeted function) (step S12).

When the function related information is judged to satisfy the predetermined condition (step S12: YES), the image generator 16 decides that the targeted function is a function that will be targeted for a shortcut (i.e. the function that can be used from a shortcut image) (step S13).

Conversely, when the function related information does not satisfy a predetermined condition (step S12: NO), the processing in step S13 is not executed, and processing proceeds to step S14.

Next, the image generator 16 judges whether the processing to judge whether the predetermined condition is satisfied has been executed for all of the functions related to the game (step S14).

When the image generator 16 judges that the processing has not been executed for all of the functions related to the game (step S14: NO), processing returns to step S11, and processing is repeated, with the function for which processing has not been executed becoming the targeted function.

Conversely, when judging that the processing has been executed for all of the functions related to the game (step S14: YES), the image generator 16 generates a shortcut image that includes a shortcut key allowing for use of each function, among the plurality of functions, that was decided on in step S13 (step S15). Each shortcut image generated in this way is displayed in the header area 103 on the display screen of the communication terminal 20, as described above.

When there is no function that is the target of a shortcut (S12: NO), a default shortcut image displayed by the web application is generated.

When the number of functions that can be used from shortcut images is set in advance and the number of functions decided on in step S13 is greater than the number set in advance, then the functions that can be used from shortcut images may be decided on in accordance with the priority set for each function or in accordance with the above-described rate of utilization.

As described above, icons representing the functions decided on in step S13 are displayed as shortcut images in the header area 103. When the number of functions that can be used from a shortcut image is not set in advance, the size of the icons may be changed so as to allow for display of all of the icons representing the functions decided on in step S13.

The processing in steps S11 and S12 in FIG. 6 is now described in detail. Here, it is assumed that the functions represented by icons 201 to 212 illustrated in FIG. 5 are included in the plurality of functions related to the game. The user playing the game by using the communication terminal 20 is simply referred to as the user, and users (players) other than the user are referred to as other users.

When the targeted function is the "shop" function represented by icon 201, then information (discount information) indicating that items in the shop are discounted (at the current time) from their regular price is included in the function related information that is related to this function. Furthermore, when the targeted function is the "shop" function, then the fact that items in the shop are discounted (at the current time) is included in the condition set in advance for this function. In other words, when the targeted function is the "shop" function, and for example discount information indicating that the "recovery medicine" can be purchased at a lower price than usual is retrieved in step S11, then the function related information is judged to satisfy the predetermined condition in step S12. In this way, since a shortcut image allowing for use of the "shop" function is displayed, the user can be notified by the shortcut image that a variety of items are discounted, and the user can be encouraged to use the "shop" function.

When the targeted function is the "strengthen" function represented by icon 202, then information (reinforcing campaign information) indicating that the success rate of strengthening (combination rate) is higher than usual (at the current time) is included in the function related information that is related to this function. Furthermore, when the "strengthening" function is targeted, then the fact that the success rate of strengthening is higher than usual (at the current time) is included in the condition set in advance for this function. In other words, when the targeted function is the "strengthening" function, and for example reinforcing campaign information indicating that strengthening can be performed at three times the usual success rate is retrieved in step S11, then the function related information is judged to satisfy the predetermined condition in step S12. In this way, since a shortcut image allowing for use of the "strengthening" function is displayed, the user can be notified by the shortcut image that the success rate of strengthening is higher than normal, and the user can be encouraged to use the "strengthening" function.

When the targeted function is the "trade" function represented by icon 203, then information (card count information) indicating the number of cards that the user possesses is included in the function related information that is related to this function. Furthermore, when the targeted function is the "trade" function, then the fact that the user possesses a predetermined number of cards (for example, 50 cards) is included in the condition set in advance for this function. In other words, when the targeted function is the "trade" function, and for example card count information indicating that the user possesses 60 cards is retrieved in step S11, then the function related information is judged to satisfy the predetermined condition in step S12. In this way, since a shortcut image allowing for use of the "trade" function is displayed, the user can be notified by the shortcut image that the user possesses a predetermined number of cards or more, and the user can be encouraged to use the "trade" function. While the fact that the user possesses a predetermined number of cards has been described as the condition set in advance for the "trade" function, information indicating the type of card that the user possesses may be included in the card count information, and the condition may be that the user possesses a card desired by another user (friend).

When the targeted function is the "battle deck" function represented by icon 204, then information (card acquisition information) indicating that the user has acquired a card in the game is included in the function related information that is related to this function. Furthermore, when the targeted function is the "battle deck" function, then the fact that the user has acquired a new card (for example, a rare card with a high rarity value) is included in the condition set in advance for this function. In other words, when the targeted function is the "battle deck" function, and for example card acquisition information indicating that the user has acquired a rare card with a high rarity value is retrieved in step S11, then the function related information is judged to satisfy the predetermined condition in step S12. In this way, since a shortcut image allowing for use of the "battle deck" function is displayed, the user can be notified by the shortcut image that the user has newly acquired a rare card with a high rarity value, and the user can be encouraged to use the "battle deck" function (i.e. to form a battle deck).

When the targeted function is the "team" function represented by icon 205, then information (friend status information) indicating the status of another user (friend) is included in the function related information that is related to this function. Furthermore, when the targeted function is the "team" function, then the fact that another user (friend) is battling an enemy character referred to as a "raid boss" (an enemy character that is battled through cooperation with other users) is included in the condition set in advance for this function. In other words, when the targeted function is the "team" function, and for example friend status information indicating that a friend of the user is battling a raid boss (participating in a battle) is retrieved in step S11, then the function related information is judged to satisfy the predetermined condition in step S12. In this way, since a shortcut image allowing for use of the "team" function is displayed, the user can be notified by the shortcut image that a friend is battling a raid boss, and the user can be encouraged to use the "team" function.

When the targeted function is the "friend" function represented by icon 206, then information (information on a request to join a team) indicating whether another user desires to join the team that the user belongs to (a team composed of a plurality of users) is included in the function related information that is related to this function. Furthermore, when the targeted function is the "friend" function, then the fact that another user desires to join the team that the user belongs to is included in the condition set in advance for this function. In other words, when the targeted function is the "friend" function, and for example information on a request to join a team, indicating that another user desires to join the team to which the user belongs, is retrieved in step S11, then the function related information is judged to satisfy the predetermined condition in step S12. In this way, since a shortcut image allowing for use of the "friend" function is displayed, the user can be notified by the shortcut image that another user desires to join the team to which the user belongs, and the user can be encouraged to use the "friend" function to add the other user to the team.

When the targeted function is the "invite" function represented by icon 207, then information (headhunting information) indicating whether the user is being invited to join another team (which the user has not joined) is included in the function related information that is related to this function. Furthermore, when the targeted function is the "invite" function, then the fact that the user is being invited to join another team is included in the condition set in advance for this function. In other words, when the targeted function is the "invite" function, and for example headhunting information indicating that the user is being invited to join another team is retrieved in step S11, then the function related information is judged to satisfy the predetermined condition in step S12. In this way, since a shortcut image allowing for use of the "invite" function is displayed, the user can be notified by the shortcut image that the user is being invited to join another team.

When the targeted function is the "illustrated guide" function represented by icon 208, then information (card acquisition information) indicating that the user has acquired a card in the game is included in the function related information that is related to this function. Furthermore, when the targeted function is the "illustrated guide" function, then the fact that the user has acquired a new card (for example, a rare card with a high rarity value) is included in the condition set in advance for this function. In other words, when the targeted function is the "illustrated guide" function, and for example card acquisition information indicating that the user has acquired a rare card with a high rarity value is retrieved in step S11, then the function related information is judged to satisfy the predetermined condition in step S12. In this way, since a shortcut image allowing for use of the "illustrated guide" function is displayed, the user can be notified by the shortcut image that the user has newly acquired a rare card with a high rarity value, and the user can be encouraged to confirm this with the "illustrated guide" function.

When the targeted function is the "quest history" function represented by icon 209, then information (quest completion information) indicating the status of completion for each quest that is set in advance in the game is included in the function related information that is related to this function. Furthermore, when the targeted function is the "quest history" function, then the fact that the user has cleared a new quest is included in the condition set in advance for this function. In other words, when the targeted function is the "quest history" function, and for example quest completion information indicating that the user has cleared a new quest is retrieved in step S11, then the function related information is judged to satisfy the predetermined condition in step S12. In this way, since a shortcut image allowing for use of the "quest history" function is displayed, the user can be notified by the shortcut image that the user has cleared a new quest, and the user can be encouraged to confirm this with the "quest history" function.

When the targeted function is the "event history" function represented by icon 210, then information (event information) on a variety of events that occur in response to game progress or the like is included in the function related information that is related to this function. Furthermore, when the targeted function is the "event history" function, then the fact that a new event has occurred is included in the condition set in advance for this function. In other words, when the targeted function is the "event history" function, and for example event information indicating that a new event has occurred is retrieved in step S11, then the function related information is judged to satisfy the predetermined condition in step S12. In this way, since a shortcut image allowing for use of the "event history" function is displayed, the user can be notified by the shortcut image that a new event has occurred, and the user can be encouraged to participate in the event.

When the targeted function is the "how to play" function represented by icon 211, then information (information on length of play time) indicating the length of time the user has played the game is included in the function related information that is related to this function. Furthermore, when the targeted function is the "how to play" function, then the fact that the length of time the user has played the game has not reached a predetermined length of time is included in the condition set in advance for this function. In other words, when the targeted function is the "how to play" function, and the length of time (length of time the user has played the game) indicated by the information on length of play time retrieved in step S11 has not reached a predetermined length of time, then the function related information is judged to satisfy the predetermined condition in step S12. In this way, since a shortcut image allowing for use of the "how to play" function is displayed, a user who has played the game for a short length of time (a beginner) can be encouraged to use the "how to play" function.

When the targeted function is the "coins" function represented by icon 212, then information (acquired coin information) indicating the number of coins that the user has acquired (i.e. coins that the user possesses) is included in the function related information that is related to this function. Furthermore, when the targeted function is the "coins" function, then the fact that the number of coins that the user has acquired is equal to or less than a predetermined number is included in the condition set in advance for this function. In other words, when the targeted function is the "coins" function, and the number of coins indicated by the acquired coin information retrieved in step S11 is equal to or less than a predetermined number, then the function related information is judged to satisfy the predetermined condition in step S12. In this way, since a shortcut image allowing for use of the "coins" function is displayed, the user can be notified by the shortcut image that the user's acquired number of coins is equal to or less than a predetermined number, and the user can be encouraged to confirm the number of acquired coins with the "coins" function.

As described above, setting a predetermined condition for each of a plurality of functions related to the game and generating a shortcut image for a function that satisfies the condition makes it possible to decide on a function with a high probability (necessity) of being used in accordance with conditions of game progress as the target of a shortcut.

Figure 7:
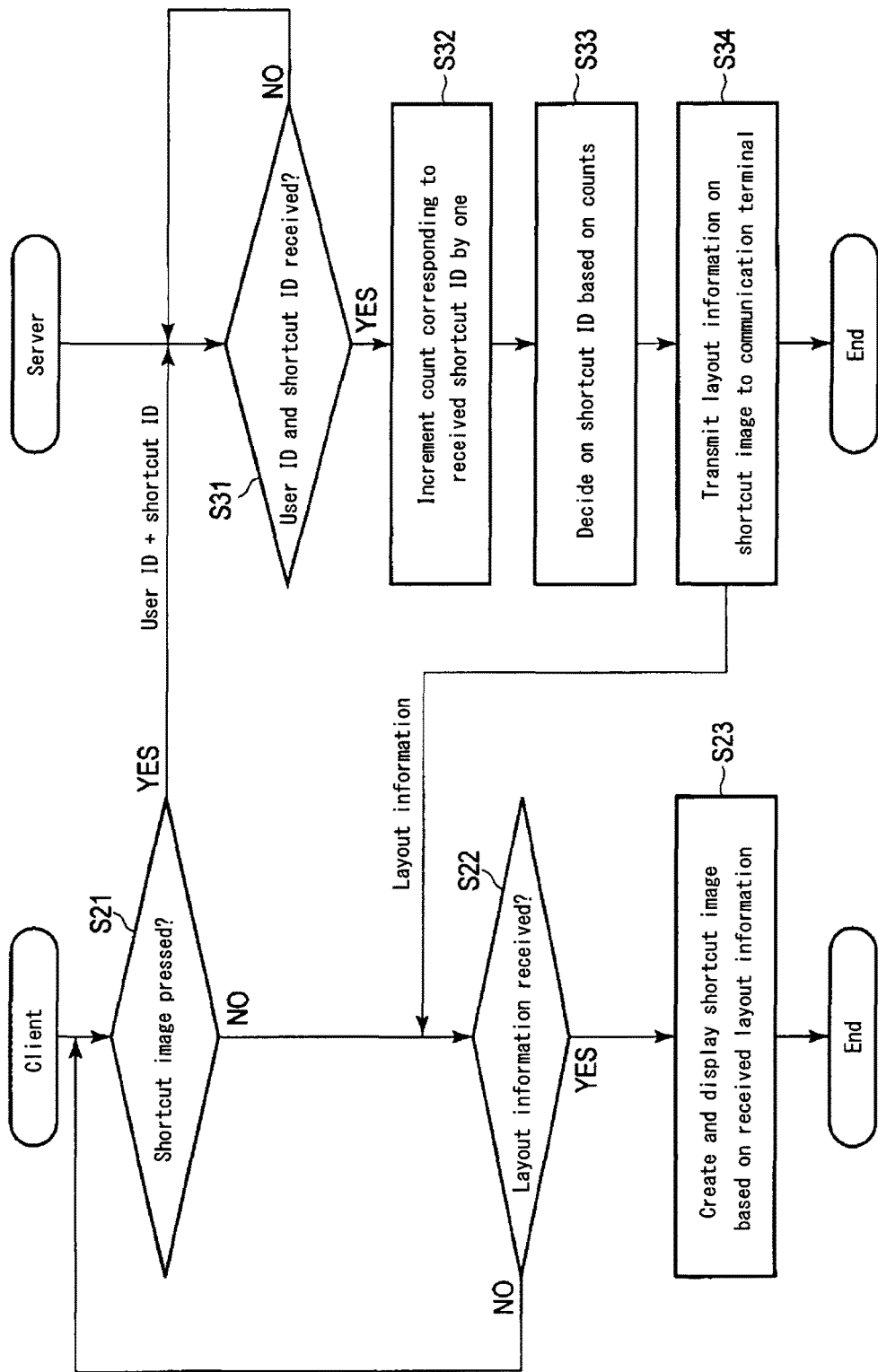
FIG. 7 is a flowchart illustrating operations to change a shortcut in accordance with the user's rate of utilization.

FIG. 7 is a flowchart illustrating operations to change a shortcut in accordance with the user's rate of utilization.

As illustrated in FIG. 7, when a predetermined shortcut image is pressed on the communication terminal 20 (client), shortcut identification information (shortcut ID) indicating the shortcut of the pressed shortcut image and user identification information (user ID) of the user are transmitted via the network from the communication terminal 20 to the server 10 (S21).

Figure 8:
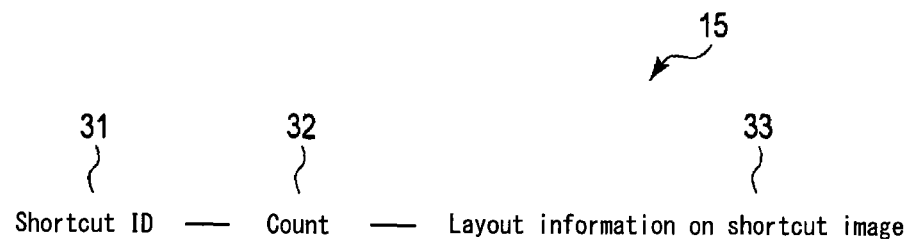
FIG. 8 illustrates a data structure in which a shortcut ID 31, count 32, and layout information 33 on a shortcut image are associated.

As illustrated in FIG. 8, a shortcut ID 31, count 32, and layout information 33 on a shortcut image are stored in association in the rate of utilization storage 15 of the server 10.

When the server 10 receives the shortcut ID and the user ID from the communication terminal 20 (S31: Yes), the server 10 increments the count associated with the received shortcut ID by one (S32). It is thus possible to confirm the number of times that the shortcut image has been pressed.

Next, based on the counts 32 stored in the rate of utilization storage 15 (database), a shortcut ID is decided on (S33). Specifically, a shortcut with a high rate of utilization is determined based on the ranking of counts 32 stored in the rate of utilization storage 15. As illustrated in FIG. 8, layout information 33 on a shortcut image is associated with the shortcut ID 31. For example, the layout information 33 includes required information for layout, such as the coordinates, size, and color of the shortcut image.

Next, the layout information 33 on the shortcut image associated with the shortcut ID 31 decided on in S33 is transmitted over the network to the communication terminal corresponding to the received user ID (S34).

Conversely, when it is judged in S21 that a shortcut image has not been pressed, then it is judged whether layout information 33 has been received from the server 10 (S22). In S22, when it is judged that layout information 33 has not been received, processing returns to step S21.

When layout information has been received in S22, then based on the received layout information 33, a shortcut image is created and displayed (S23).

Figure 9:
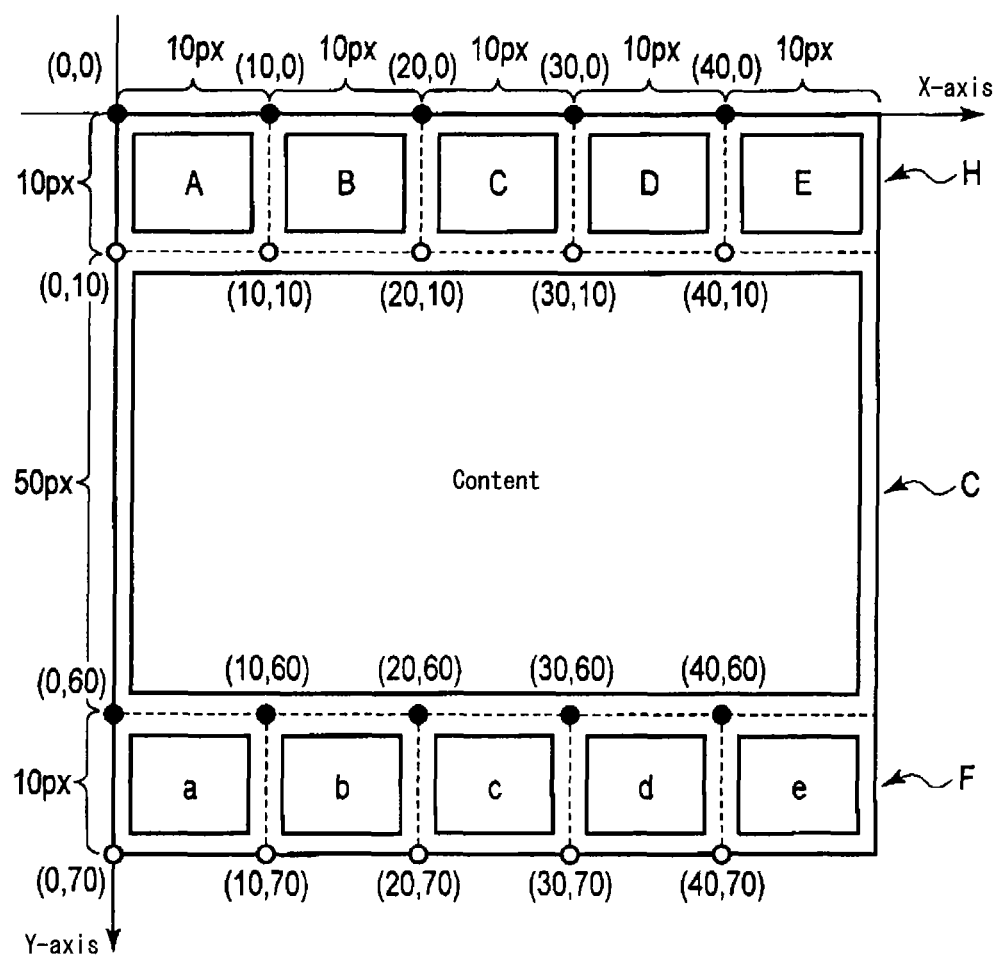
FIG. 9 illustrates a screen displayed on the communication terminal 20 by a web application in a hybrid application program.

FIG. 9 illustrates a screen displayed on the communication terminal 20 by a web application in a hybrid application program.

In FIG. 9, the images displayed in the header area H and the footer area F are displayed by the web application program in the hybrid application program. The images displayed in the content area C are displayed by the native application program in the hybrid application program. The native application program can also display images in the header area H and the footer area F.

When an image displayed by the native application program overlaps with an image displayed by the web application program, the image displayed by the web application program is prioritized and displayed (in overlap).

A program for generating the screen that, within the screen illustrated in FIG. 9, is displayed by the web application program in the hybrid application program is described based on layout information transmitted from the server 10. In other words, based on the received layout information, the web application program in the hybrid application program of the communication terminal 20 generates the screen, within the screen illustrated in FIG. 9, for the header area H and the footer area F displayed by the web application program in the hybrid application program.

As illustrated in FIG. 9, shortcut images A to E are displayed in the header area H, and shortcut images a to e are displayed in the footer area F. As described with reference to FIG. 7, upon detecting that a shortcut image has been pressed, the hybrid application program transmits the user ID and the ID of the pressed shortcut image to the server 10. In other words, the header area H and the footer area F are areas subject to user operation.

Figure 10:
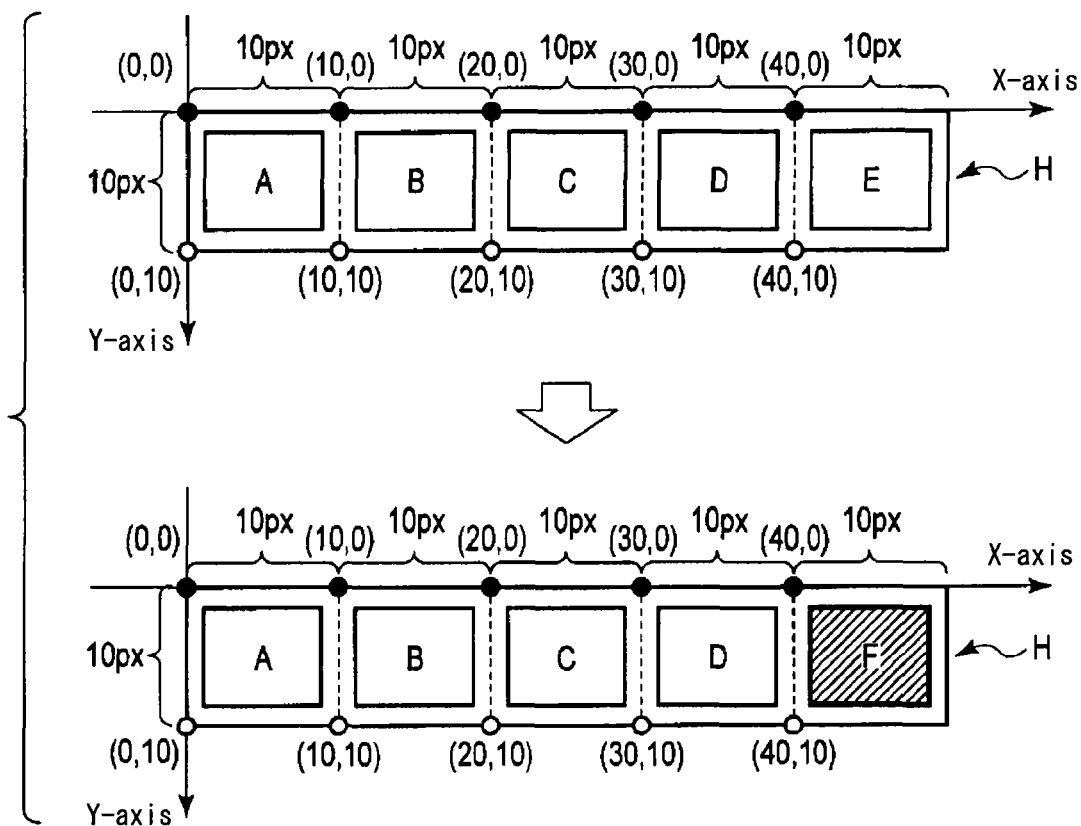
FIG. 10 illustrates the change to a screen in a header area H displayed on the communication terminal 20 by a web application in a hybrid application program.

FIG. 10 illustrates the change to a screen in a header area H displayed on the communication terminal 20 by the web application in the hybrid application program.

In a default state, shortcuts A to E are displayed in the header area H. Thereafter, if the count of shortcut F increases and becomes greater than the count of shortcut E, then instead of shortcut E, shortcut F is displayed.

A program for generating the screen that, after a shortcut change, is displayed by the web application program in the hybrid application program is described based on layout information transmitted from the server 10.

Based on the received layout information, the web application program in the hybrid application program of the communication terminal 20 generates the shortcut screen in the header area H after a shortcut has been changed, as illustrated in FIG. 10.

One or a plurality of shortcuts may be targeted for change. Furthermore, as the layout information 33, the layout information of all of the images displayed by the web application program may be transmitted, or the layout information only for the shortcut being changed may be transmitted.

<Additional Embodiment 1>

In the above-described embodiment, shortcuts are changed based on the rate of utilization (for example, the count) of shortcuts.

In Additional Embodiment 1, instead of changing the shortcut itself, the size of the shortcut is changed.

Figure 11:
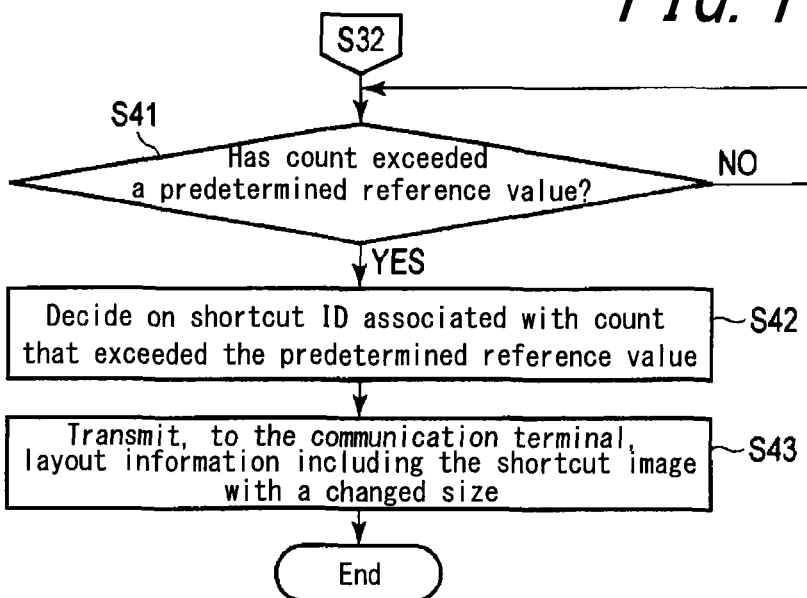
FIG. 11 is a flowchart illustrating operations of Additional Embodiment 1.

FIG. 11 is a flowchart illustrating operations of Additional Embodiment 1. Steps that are the same as in FIG. 7 are labeled identically, and a description thereof is omitted. Only the differences are described below.

After the count associated with the received shortcut ID is incremented by one in S32 of FIG. 7, it is judged whether the count associated with the shortcut ID has exceeded a predetermined reference value (S41).

When it is judged in S41 that the count has exceeded the predetermined reference value (S41: Yes), the shortcut ID 31 associated with the count that exceeded the predetermined reference value is decided on (S42).

Next, the size of the shortcut image associated with the shortcut ID 31 decided on in S42 is changed, and the corresponding layout information 33 is transmitted over the network to the communication terminal corresponding to the received user ID (S43).

Figure 12:
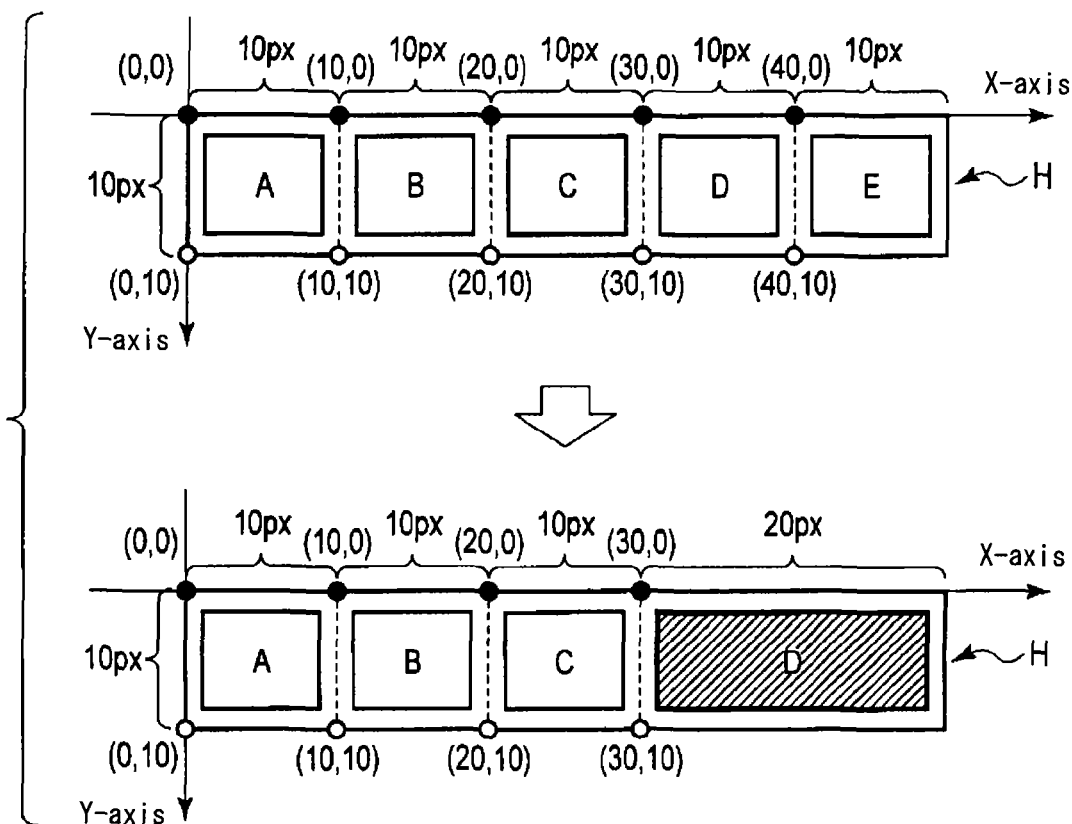
FIG. 12 illustrates the change to a screen in a header area H displayed on the communication terminal 20 by a web application in a hybrid application program.

FIG. 12 illustrates the change to a screen in a header area H displayed on the communication terminal 20 by the web application in the hybrid application program.

In a default state, shortcuts A to E are displayed in the header area H. Thereafter, if the count of shortcut D increases and exceeds the predetermined reference value, then shortcut D is displayed at an expanded size. As a result, shortcut E is not displayed.

A program for generating the screen, in which the size of a shortcut has been changed, that is displayed by the web application program in the hybrid application program is described based on layout information transmitted from the server 10.

Based on the received layout information, the web application program in the hybrid application program of the communication terminal 20 generates the screen, in the header area H, in which the size of a shortcut has been changed (expanded), as illustrated in FIG. 12.

Therefore, according to this embodiment, the size of a shortcut with a high rate of utilization can be changed, thereby improving the user operability of the shortcut. Furthermore, since the shortcut image is changed using the web application program, the shortcut structure can be changed rapidly.

<Additional Embodiment 2>

In the above-described embodiment, shortcuts are changed or resized based on the rate of utilization (for example, the count) of shortcuts.

The configuration of shortcuts may, however, be managed user-by-user.

Figure 13:
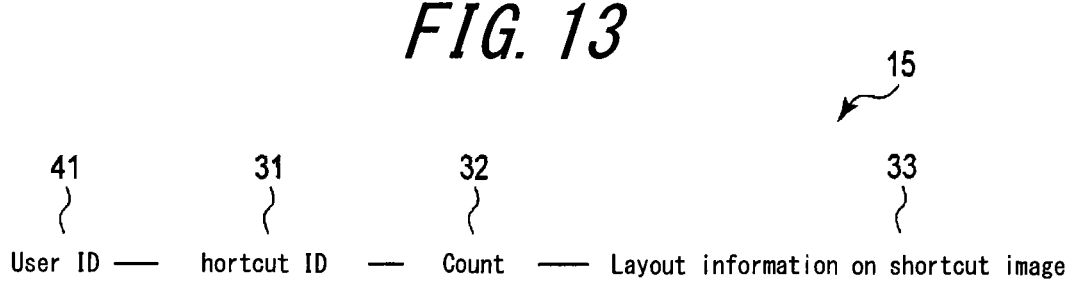
FIG. 13 illustrates a data structure in which a user ID 41, shortcut ID 31, count 32, and layout information 33 on a shortcut image are associated.

When the rate of utilization of shortcuts is managed for each user rather than for each shortcut, then as illustrated in FIG. 13, a user ID 41, shortcut ID 31, count 32, and layout information 33 on a shortcut image are stored in association.

Figure 14:
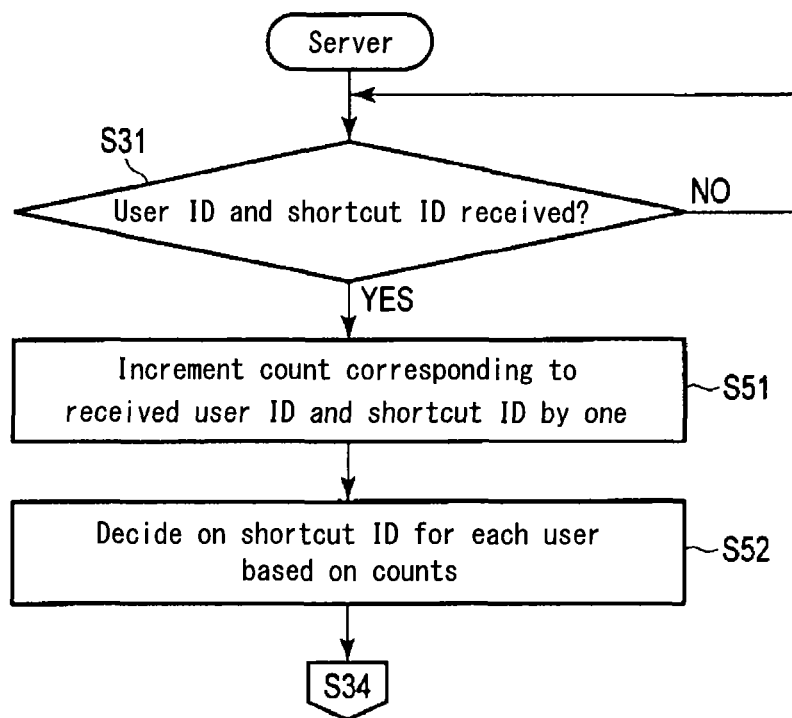
FIG. 14 is a flowchart illustrating operations of Additional Embodiment 2.

FIG. 14 is a flowchart illustrating operations of Additional Embodiment 2. Steps that are the same as in FIG. 7 are labeled identically, and a description thereof is omitted. Only the differences are described below.

When the server 10 receives the user ID and the shortcut ID from the communication terminal 20 (S31: Yes), the server 10 increments the count associated with the received user ID and shortcut ID by one (S51). It is thus possible to confirm the number of times that the shortcut image has been pressed for each user.

Next, based on the counts 32 stored in the rate of utilization storage 15 (database), a shortcut ID is decided on for each user (S52). Specifically, a shortcut with a high rate of utilization is determined based on the ranking of counts 32 stored in the rate of utilization storage 15. As illustrated in FIG. 13, layout information 33 on a shortcut image is associated with the shortcut ID 31. For example, the layout information 33 includes required information for layout, such as the coordinates, size, and color of the shortcut image.

Next, the layout information 33 on a shortcut image associated with the shortcut ID 31 decided on in S52 is transmitted over the network to the communication terminal corresponding to the received user ID (S34).

Figure 15:
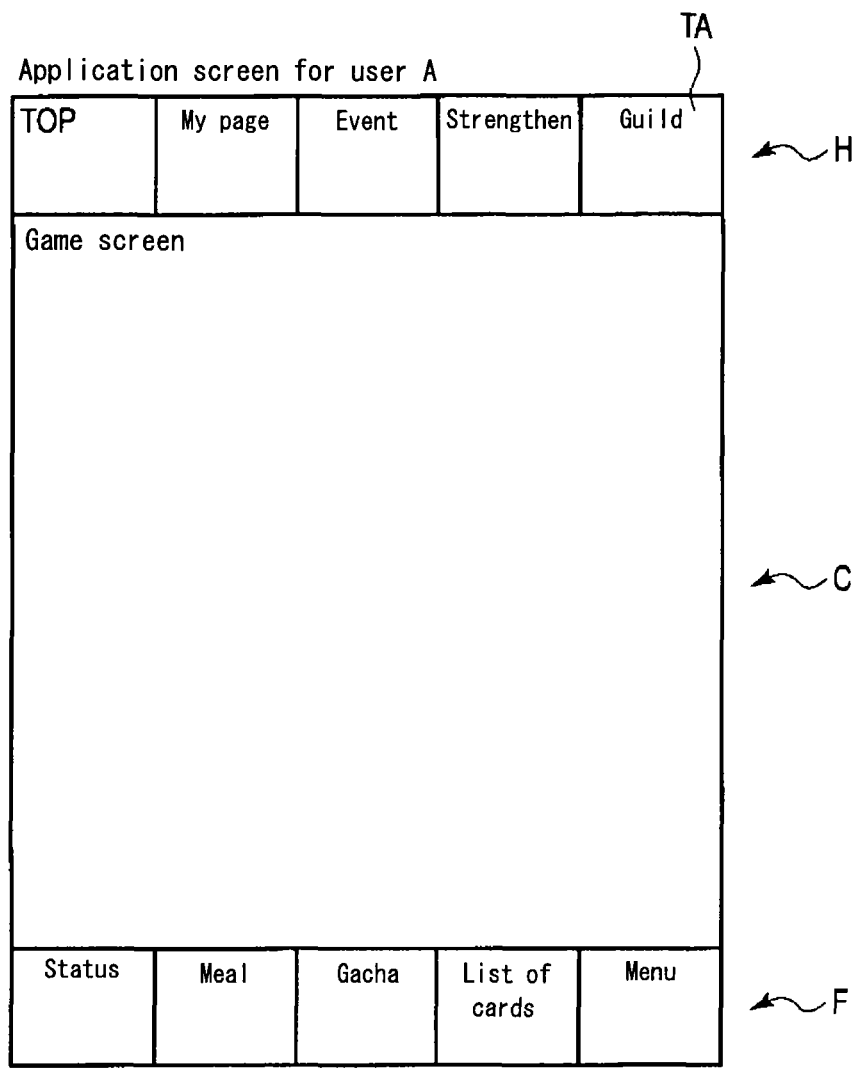
FIG. 15 illustrates a screen displayed on the communication terminal 20 of user A.
Figure 16:
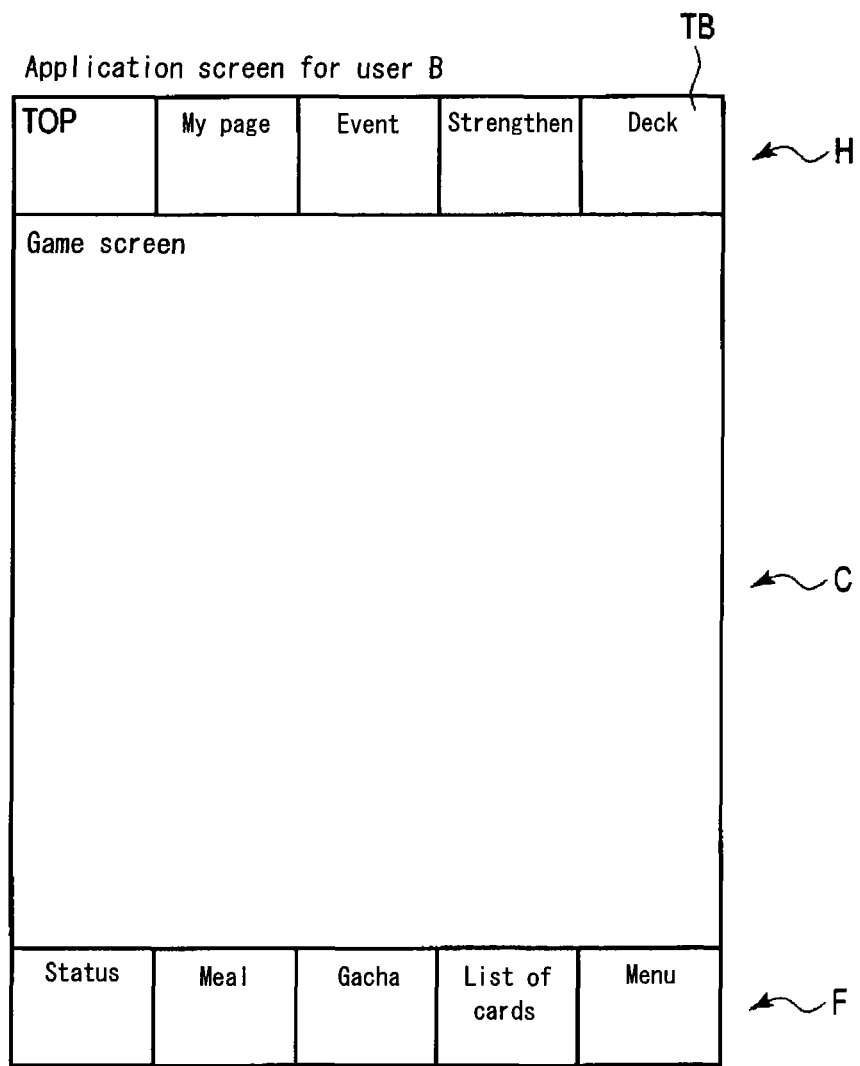
FIG. 16 illustrates a screen displayed on the communication terminal 20 of user B.

FIG. 15 illustrates a screen displayed on the communication terminal 20 of user A, and FIG. 16 illustrates a screen displayed on the communication terminal 20 of user B. As illustrated in FIG. 15, the shortcut that is illustrated to the right in the header area H and that is the target of a change is the image of a shortcut TA related to a guild function. On the other hand, as illustrated in FIG. 16, the shortcut that is illustrated to the right in the header area H and that is the target of a change is the image of a shortcut TB related to the deck function.

Displaying a different shortcut image for each user in this way makes the game more user-friendly, thereby making the game more attractive for users.

The count of a shortcut in the above-described embodiments is now described in greater detail.

The server 10 monitors user actions (events) from the communication terminal 20.

FIG. 17 illustrates a table in which user actions targeted for counting are associated with the number of points added to the count of a shortcut.

As illustrated in FIG. 17, user actions targeted for counting are associated with the number of points added to the count of a shortcut. For example, in FIG. 17, when the user selects the action "transition to deck selection screen", the count associated with the shortcut ID related to the deck is incremented by one. Also, when the user selects the action "construct a deck", the count associated with the shortcut ID related to the deck is incremented by one.

When shortcuts are managed user-by-user as illustrated in FIG. 13, then the table illustrated in FIG. 17 may be managed for each user.

FIG. 18 illustrates actions by different users A and B.

As is clear from FIG. 18, the action "select guild" is frequent for user A, whereas actions related to the deck, such as "transition to deck selection screen" and "construct deck", are frequent for user B.

In this way, the count associated with the shortcut ID not only increases when the shortcut image is pressed, but also increases based on user actions.

<Additional Embodiment 3>

Additional Embodiment 3 is related to shortcut image display for members within a guild. Here, a guild refers to a group of users within the game. For example, a guild may be a group of users with ties of friendship, a group of users for battling the same monster, or the like.

FIG. 19 illustrates the data structure that is stored in the rate of utilization storage 15 (database) in the server 10 and that illustrates the relationship between users and guilds.

As illustrated in FIG. 19, a guild ID 51 and leader flag 52 are associated with each user ID 41.

In FIG. 19, user 1, user 2, . . . , user N belong to guild 1. User 2 is the leader of guild 1, as indicated by the leader flag 52.

User X1, X3, . . . , user XN belong to guild 2. User XN is the leader of guild 2, as indicated by the leader flag 52.

Figure 20:
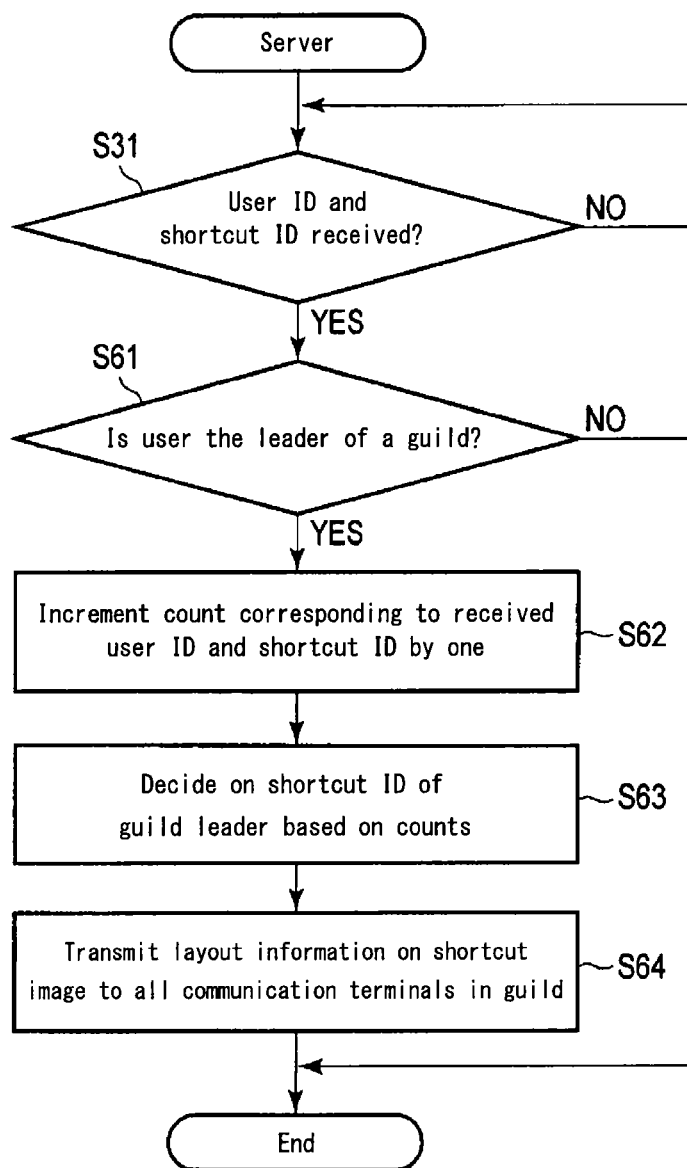
FIG. 20 is a flowchart illustrating operations of Additional Embodiment 3.

Next, the operations in Additional Embodiment 3 are described with reference to the flowchart in FIG. 20. Steps that are the same as in FIG. 7 are labeled identically, and a description thereof is omitted.

When the server 10 receives the shortcut ID and the user ID from the communication terminal 20 (S31: Yes), the server 10 judges whether the user is the leader of a guild (S61). Specifically, the server 10 judges based on whether the leader flag associated with the received user ID 41 is set.

When judging that the user is the leader of the guild in S61, the server 10 increments the count associated with the received user ID and shortcut ID by one (S62; FIG. 20).

Next, based on the counts 32 stored in the rate of utilization storage 15 (database), a shortcut ID for the guild leader is decided on (S63). Specifically, a shortcut with a high rate of utilization is determined based on the ranking of counts 32 stored in the rate of utilization storage 15.

Next, the layout information 33 on the shortcut image associated with the shortcut ID 31 decided on in S63 is transmitted over the network to the communication terminals corresponding to all of the user IDs in the guild (S64).

Specifically, the user IDs having the same guild ID are identified by referring to the table illustrated in FIG. 19. Layout information is then transmitted to the communication terminals corresponding to all of the identified user IDs.

For example, upon the shortcut being changed for user 2, who is the leader of guild 1, layout information on the same shortcut image is transmitted to user ID 1 through user ID N included in guild 1.

By adopting this configuration, the same shortcut image can be provided to the users belonging to the same guild, thus making it easier for users belonging to the guild to unify operations.

In the above-described embodiments, the case of changing the shortcut based on the count has been described, yet the shortcut ID may be decided on based on function related information associated with the shortcut ID 31.

For example, function related information may be associated with the shortcut ID 31. Time information such as a sale period, an appeal period, or the like may be included in this function related information. When the time at which the user presses a shortcut image and the server 10 receives the user ID and shortcut ID matches the time information included in the function related information associated with any of the shortcut IDs 31, the shortcut ID corresponding to the function related information may be decided on as the shortcut ID targeted for change. The information included in the function related information is not limited to time information, and a variety of conditions for deciding on the shortcut ID may be included.

In the above-described embodiments, in response to launching of an application (hybrid application) installed on the communication terminal 20, the server 10 generates an image (for example, a game image) displayed in the content area 102, which is a different area than the footer area 101 and header area 103 (first area) in which an image (such as a toolbar) is displayed. The server 10 also generates an image (for example, a shortcut image) displayed in the header area 103, which is a portion of the area displayed by the native application. The server 10 displays the game image in the content area 102 on the screen of the communication terminal 20 and displays the shortcut image in overlap in the header area 103 on the screen of the communication terminal 20. With this configuration, the content displayed in the area displayed by the native application can be changed without the user updating the data in the area displayed by the native application. In other words, according to this embodiment, the area displayed by the native application can be changed in response to operation.

In this embodiment, by displaying, in the header area 103, an image that includes a shortcut key allowing for use of a function with a high rate of utilization among the plurality of functions provided by the application, an exclusive interface (UI) can be provided for each user.

The method described in the embodiments may be stored as a computer-executable program on a recording medium, such as a magnetic disk (floppy (registered trademark) disk, hard disk, or the like), optical disc (CD-ROM, DVD, or the like), magneto-optical disc (MO), or semiconductor memory, and distributed.

As long as a program can be stored on the recording medium and the recording medium is computer readable, the actual recording may be in any format.

The operating system (OS) operating on the computer, database management software, middleware (MW) such as network software, or the like may execute a portion of the processing for implementing the embodiments based on instructions by the program installed on the computer from the recording medium.

Furthermore, the above recording medium is not limited to a medium independent of the computer, but rather includes a recording medium on which a program downloaded over a LAN, the Internet, or the like is stored or temporarily stored.

The recording medium includes not only the case of one recording medium, but also the case of the processing in the above embodiments being executed from a plurality of media. Either configuration of media may be adopted.

The above-mentioned computer executes the processing of the embodiments based on the program stored on the recording medium. The computer may be configured with one device such as a personal computer, or as a system of a plurality of devices connected over a network.

Instead of a personal computer, the above-mentioned computer may be an arithmetic processing unit included in an information processing device, a microcomputer, or the like. The term "computer" as used here collectively refers to devices that can execute the disclosed functions with a program.

This disclosure is not limited to the above embodiments, and at the implementation stage, constituent elements may be modified or concretized without departing from the scope of this disclosure. Furthermore, the plurality of constituent elements disclosed in the embodiments may be combined in a variety of ways. For example, some of the constituent elements disclosed in the embodiments may be omitted. Constituent elements may also be combined appropriately to yield other embodiments.

REFERENCE SIGNS LIST

10 Server
11 Communication interface
12 Game information storage
13 Game controller
14 Utilization management module
15 Rate of utilization storage
16 Image generator
20 Communication terminal

The invention claimed is:

1. One or more non-transitory computer-readable recording media configured to store instructions, which when executed by an information processing device configured to communicate with a server, cause the information processing device to:
   display first information on a display, the first information being generated by a first application program stored in the information processing device;
   transmit, to the server, input information corresponding to an input received at the information processing device, the input information being related to a plurality of functions of a game executed by the information processing device;
   receive, from the server, layout information corresponding to a display layout that is related to one or more pieces of second information, the one or more pieces of second information being determined in accordance with a rate of utilization of the plurality of functions of the game, based on the input information; and
   display the one or more pieces of second information on the display, by overlaying the one or more pieces of second information on the first information by a second application program that is different from the first application program, without updating the first information, based on the layout information.

2. The one or more non-transitory computer-readable recording media of claim 1,
   wherein the first information includes third information for displaying on the display, in response to the input received at the information processing device, a selection screen configured to receive an input selecting of any piece of second information among the one or more pieces of second information, and
   wherein the input corresponds to a selection, among the one or more pieces of second information, of the one or more pieces of second information rendered on the display or of said any piece of second information on the selection screen displayed by selection of the third information by a user.

3. The one or more non-transitory computer-readable recording media of claim 1, wherein
   at least one of a number or a size of the one or more pieces of second information displayed on the display is determined based on the rate of utilization of the plurality of functions related to the game.

4. The one or more non-transitory computer-readable recording media of claim 1, wherein
   the one or more pieces of second information, when selected based on the input received at the information processing device, is related to control the server to execute a predetermined function based on the selection.

5. The one or more non-transitory computer-readable recording media of claim 1, wherein the instructions further cause the information processing device to:
   display the second information in one or more areas configured by a portion of the display.

6. The one or more non-transitory computer-readable recording media of claim 1, wherein the instructions further cause the information processing device to:
   display the first information on the display by executing a native application program as the first application program stored in the information processing device.

7. The one or more non-transitory computer-readable recording media of claim 1, wherein the instructions further cause the information processing device to:
   display the second information on the display by executing a web application program as the second application program, based on the layout information received from the server.

8. The one or more non-transitory computer-readable recording media of claim 1, wherein
   the game is executed by a user of the information processing device, by activating a hybrid application program including the first application program and the second application program,
   the plurality of functions related to the game include at least one of a shop function, a strengthening function, a trade function, a battle deck function, a team function, a friend function, an invitation function, a guidance function, a quest history function, an event history function, an instruction function, and a game coin function.

9. One or more non-transitory computer-readable recording media configured to store instructions, which when executed by an information processing device configured to communicate with a server, cause the information processing device to:
   display first information on a display, the first information being generated by a first application program stored in the information processing device;
   receive, from the server, layout information corresponding to a display layout that is related to one or more pieces of second information, the one or more pieces of second information satisfying a predetermined condition related to a plurality of functions related to a game executed by the information processing device; and
   display the one or more pieces of second information on the display, by overlaying the one or more pieces of second information on the first information by a second application program that is different from the first application program, without updating the first information, based on the layout information.

10. The one or more non-transitory computer-readable recording media of claim 9,
wherein the first information includes third information for displaying on the display, in response to an input received at the information processing device, a selection screen configured to receive an input selecting any piece of second information among the one or more pieces of second information, and
wherein the second information is selected by the input, among the one or more pieces of second information, of the one or more pieces of second information rendered on the display or of any piece of second information on the selection screen displayed by selection of the third information.

11. The one or more non-transitory computer-readable recording media of claim 9, wherein
the one or more pieces of second information, when selected based on an input received at the information processing device, is related to control the server to execute a predetermined function based on the selection.

12. One or more non-transitory computer-readable recording media configured to store instructions, which when executed by an information processing device configured to communicate with a communication terminal, cause the information processing device to:
receive, from the communication terminal, input information corresponding to an input received at the communication terminal, the input information being related to a plurality of functions of a game executed by the communication terminal;
generate, based on the input information received from the communication terminal, layout information for displaying one or more pieces of second information on a display of the communication terminal, the one or more pieces of second information being determined in accordance with a rate of utilization of the plurality of functions of the game, based on the input information, and the one or more pieces of second information being displayed at the communication terminal without updating a first information generated by a first application program, the communication terminal overlaying the one or more pieces of second information on the first information by a second application program that is different from the first application program; and
transmit the layout information to the communication terminal.

13. The one or more non-transitory computer-readable recording media of claim 12, wherein
the first information includes third information for displaying on the display, in response to an input received at the information processing device, a selection screen configured to receive an input selecting of any piece of second information among the one or more pieces of second information, and
the input corresponds to a selection, among the one or more pieces of second information, of the one or more pieces of second information rendered on the display screen or of any piece of second information on the selection screen displayed by selection of the third information by a user.

14. The one or more non-transitory computer-readable recording media of claim 12, wherein
the one or more pieces of second information is for controlling the information processing device to execute a predetermined function based on an input selecting one of the one or more pieces of second information.

15. The one or more non-transitory computer-readable recording media of claim 12,
wherein the information processing device is configured to communicate with another communication terminal, and
wherein the information processing device is configured to transmit, to the another communication terminal, the layout information for displaying the one or more pieces of second information on a display of the another communication terminal.

16. A method of processing executed by an information processing device configured to communicate with a server, the method comprising:
displaying first information on a display, the first information being generated by a first application program stored in the information processing device;
transmitting, to the server, input information corresponding to an input received at the information processing device, the input information being related to a plurality of functions of a game executed by the information processing device;
receiving, from the server layout information indicating a layout of display to be displayed on the display, the layout corresponding to one or more pieces of second information being determined in accordance with a rate of utilization of the plurality of functions of the game, based on the input information; and
displaying the one or more pieces of second information on the display, by overlaying the one or more pieces of second information on the first information by a second application program that is different from the first application program, without updating the first information, based on the layout information.

17. A method of processing executed by an information processing device configured to communicate with a server, the method comprising:
displaying first information on a display, the first information being generated by a first application program stored in the information processing device;
receiving, from the server, layout information corresponding to a display layout that is related to one or more pieces of second information, the one or more pieces of second information satisfying a predetermined condition related to a plurality of functions related to a game executed by the information processing device; and
displaying the one or more pieces of second information on the display, by overlaying the one or more pieces of second information on the first information by a second application program that is different from the first application program, without updating the first information, based on the layout information.

* * * * *